United States Patent
Li et al.

(10) Patent No.: US 11,345,855 B2
(45) Date of Patent: May 31, 2022

(54) LIQUID CRYSTAL COMPOSITION AND DISPLAY DEVICE

(71) Applicant: BOE TECHNOLOGY GROUP CO., LTD., Beijing (CN)

(72) Inventors: Rui Li, Beijing (CN); Haiyan Sun, Beijing (CN); Hao Miao, Beijing (CN); Pengju Zhang, Beijing (CN); Mingxing Liu, Beijing (CN); Hong Zhu, Beijing (CN); Yajie Wang, Beijing (CN); Jingzhe Fang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 251 days.

(21) Appl. No.: 16/607,217

(22) PCT Filed: Apr. 24, 2019

(86) PCT No.: PCT/CN2019/084108
§ 371 (c)(1),
(2) Date: Oct. 22, 2019

(87) PCT Pub. No.: WO2019/206185
PCT Pub. Date: Oct. 31, 2019

(65) Prior Publication Data
US 2021/0332296 A1    Oct. 28, 2021

(30) Foreign Application Priority Data
Apr. 28, 2018 (CN) .......................... 201810402890.7

(51) Int. Cl.
*C09K 19/34* (2006.01)
*C09K 19/30* (2006.01)
*C09K 19/04* (2006.01)

(52) U.S. Cl.
CPC ...... *C09K 19/3411* (2013.01); *C09K 19/3068* (2013.01); *C09K 2019/0448* (2013.01); *C09K 2019/3084* (2013.01)

(58) Field of Classification Search
CPC .................................................... C09K 19/34
See application file for complete search history.

(56) References Cited

FOREIGN PATENT DOCUMENTS

| CN | 103333699 A | * | 10/2013 |
| CN | 103333699 A |  | 10/2013 |
| CN | 108485681 A |  | 9/2018 |
| CN | 109082282 A | * | 12/2018 |
| JP | 2003029246 A | * | 1/2003 |
| JP | 2003029246 A |  | 1/2003 |

OTHER PUBLICATIONS

Machine Translation of CN 103333699 A (Year: 2021).*
Machine Translation of JP 2003029246 A (Year: 2021).*

* cited by examiner

*Primary Examiner* — Chanceity N Robinson
(74) *Attorney, Agent, or Firm* — Dilworth & Barrese, LLP.; Michael J. Musella, Esq.

(57) ABSTRACT

A liquid crystal composition and a display device are provided. The liquid crystal composition includes a compound having a structure represented by general formula (I) and a compound having a structure represented by general formula (II),

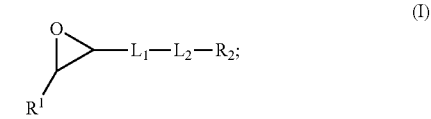

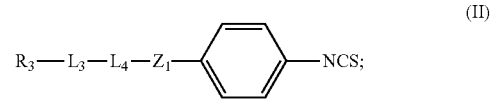

and $L_1$, $L_2$, $L_3$ and $L_4$ are independently selected from

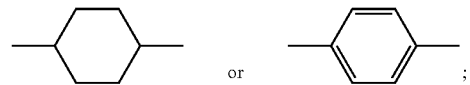

$Z_1$ is selected from a single bond or —C≡C—; $R_1$, $R_2$ and $R_3$ are independently selected from alkyl, alkenyl, alkynyl, haloalkyl or $OR_4$; and $R_4$ is selected from alkyl, alkenyl, alkynyl or haloalkyl.

9 Claims, No Drawings

LIQUID CRYSTAL COMPOSITION AND DISPLAY DEVICE

The present application claims the priority of the Chinese Patent Application No. 201810402890.7 filed on Apr. 28, 2018, which is incorporated herein by reference as a part of the present application.

TECHNICAL FIELD

The present disclosure relates to a field of liquid crystal display, and in particular to a liquid crystal composition and a display device.

BACKGROUND

Liquid crystal is an intermediate phase between a liquid state and a crystalline state, and the liquid crystal has both fluidity of liquid and anisotropy of crystal. As an important functional material in a digital information age, the liquid crystal is widely used in the fields of liquid crystal display, temperature detection, stress detection, non-destructive detection, chromatography and various spectrum analysis and other fields.

SUMMARY

At least one embodiment of the present disclosure provides a liquid crystal composition, and the liquid crystal composition comprises: a compound having a structure represented by general formula (I) and a compound having a structure represented by general formula (II)

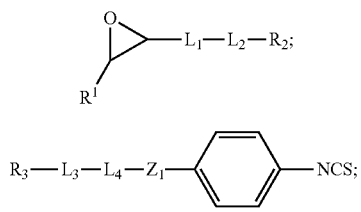

(I)

(II)

in which $L_1$, $L_2$, $L_3$ and $L_4$ are independently selected from

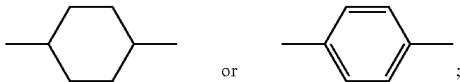

or ;

$Z_1$ is selected from a single bond or —C≡C—; $R_1$, $R_2$ and $R_3$ are independently selected from alkyl, alkenyl, alkynyl, haloalkyl, or $OR_4$; and $R_4$ is selected from alkyl, alkenyl, alkynyl or haloalkyl.

For example, in a liquid crystal composition provided by at least one embodiment of the present disclosure, $R_1$, $R_2$ and $R_3$ are independently selected from C1 to C8 alkyl, C2 to C8 alkenyl, C2 to C8 alkynyl, C1 to C8 haloalkyl, or $OR_4$; and $R_4$ is selected from C1 to C8 alkyl, C2 to C8 alkenyl, C2 to C8 alkynyl, or C1 to C8 haloalkyl.

For example, in a liquid crystal composition provided by at least one embodiment of the present disclosure, $L_1$, $L_2$, $L_3$ and $L_4$ are

;

$Z_1$ is —C≡C—; $R_1$ is N-propyl; $R_2$ is vinyl; $R_3$ is methyl.

For example, in a liquid crystal composition provided by at least one embodiment of the present disclosure, based on a total mass of the liquid crystal composition, the compound having the formula (I) has a mass percentage of about 10 wt % to 20 wt %; and the compound having the formula (II) has a mass percentage of about 5 wt % to 15 wt %.

For example, in a liquid crystal composition provided by at least one embodiment of the present disclosure, the liquid crystal composition has a melting point (S—N)≤−50° C. from a crystalline state to a nematic phase.

For example, in a liquid crystal composition provided by at least one embodiment of the present disclosure, the liquid crystal composition has one or more of the following properties: a clearing point Cp of the liquid crystal composition is 103±5° C.; a dielectric anisotropy Δε of the liquid crystal composition is 6.1±0.5; and an optical anisotropy Δn of the liquid crystal composition is 0.118±0.005.

For example, a liquid crystal composition provided by at least one embodiment of the present disclosure further comprises: compounds having a structure represented by general formulae (III) to (VIII) respectively:

(III)

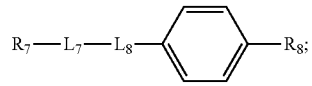
(IV)

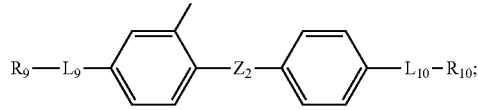
(V)

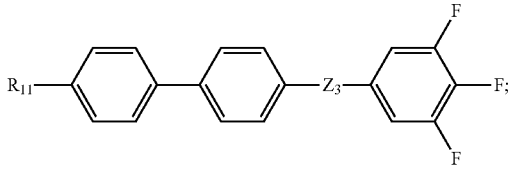
(VI)

(VII)

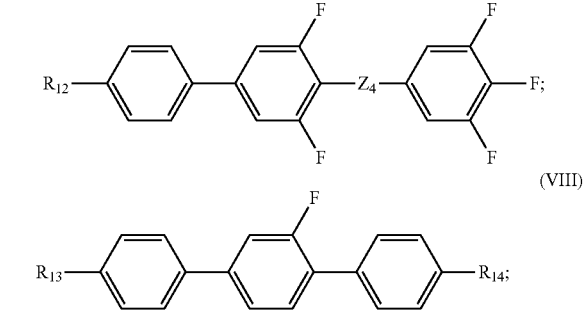
(VIII)

in which $L_5$, $L_6$, $L_7$, $L_8$, $L_9$ and $L_{10}$ are independently selected from

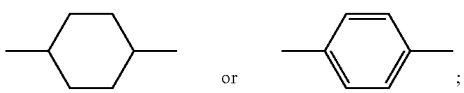 or ;

$Z_2$, $Z_3$ and $L_4$ are independently selected from a single bond, —C C=C—, —C≡C—, —O—, —COO—, —OCO—, —CH$_2$O— or —OCH$_2$—;

$R_5$, $R_6$, $R_7$, $R_8$, $R_9$, $R_{10}$, $R_{11}$, $R_{12}$, $R_{13}$, and $R_{14}$ are independently selected from C1 to C8 alkyl, C2 to C8 alkenyl, C2 to C8 alkynyl, C1 to C8 haloalkyl or $OR_{15}$; and $R_{15}$ is selected from C1 to C8 alkyl, C2 to C8 alkenyl, C2 to C8 alkynyl or C1 to C8 haloalkyl.

For example, in a liquid crystal composition provided by at least one embodiment of the present disclosure, $L_5$, $L_6$, $L_7$, $L_8$, $L_9$ and $L_{10}$ are

 ;

$Z_2$, $Z_3$, and $L_4$ are —COO—; $R_5$, $R_9$, $R_{11}$, $R_{12}$, and $R_{13}$ are N-propyl; $R_6$ is vinyl; $R_7$ and $R_{14}$ are N-butenyl; $R_8$ is methyl; and $R_{10}$ is ethoxy.

For example, a liquid crystal composition provided by at least one embodiment of the present disclosure comprises compounds having a structural formulae (1) to (8) respectively:

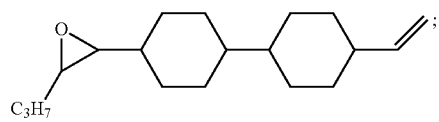

(1)

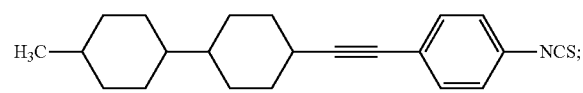

(2)

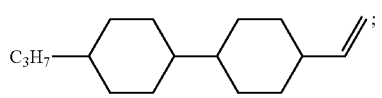

(3)

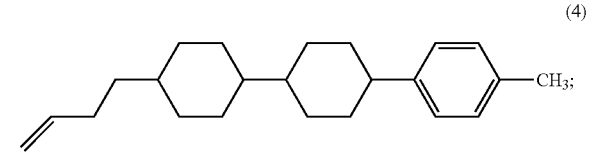

(4)

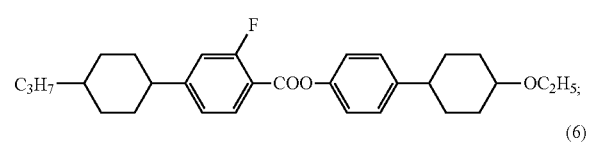

(5)

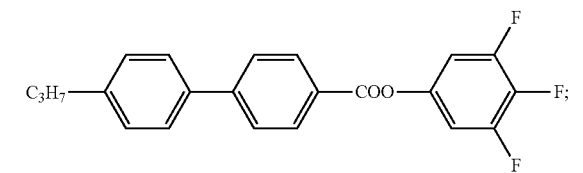

(6)

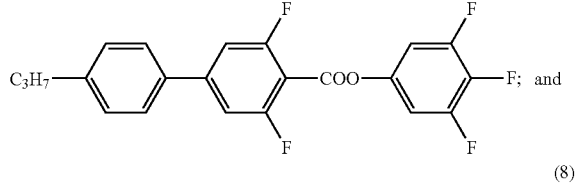

(7)

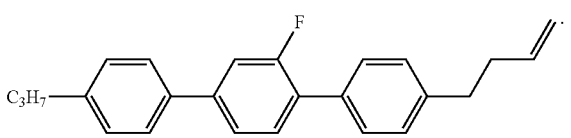

(8)

For example, in a liquid crystal composition provided by at least one embodiment of the present disclosure, based on a total mass of the liquid crystal composition, the compound having the structural formula (1) has a mass percentage of about 15 wt %; and the compound having the structural formula (2) has a mass percentage of about 10 wt %.

At least one embodiment of the present disclosure further provides a display device, and the display device comprises any one of the liquid crystal compositions described above.

DETAILED DESCRIPTION

Unless otherwise defined, all the technical and scientific terms used herein have the same meanings as commonly understood by those skilled in the art to which the present disclosure belongs. All patents and publications referred to in the present disclosure are hereby incorporated by reference in entirety. The terms "comprises," "comprising," "includes," "including," etc. are open-ended expressions that include the elements of the present disclosure, but do not exclude other elements. In the present disclosure, all the numbers disclosed herein are approximate, whether the wording "about" is used or not. The value of each number may have a difference of less than 10% or a reasonable difference considered by those skilled in the art, such as a difference of 1%, 2%, 3%, 4% or 5%.

In the embodiment of the present disclosure, the term "optional" or "optionally" means that the subsequently described event or circumstance may occur, but does not necessarily occur, and the description includes the situation in which the event or circumstance occurs and the situation in which the event or circumstance does not occur. For example, "an optional bond" means that the bond may exist or may not exist, and the description includes a single bond, a double bond, or a triple bond.

In various portions of the specification, substituents of the compounds disclosed in the embodiments of the present disclosure are disclosed in terms of the types or ranges of groups. In particular, the present disclosure includes each individual sub-combination of members of these types and ranges of the groups. For example, the term "$C_1$-$C_6$ alkyl" specifically refers to independently disclosed methyl, ethyl, $C_3$ alkyl, $C_4$ alkyl, $C_5$ alkyl, and $C_6$ alkyl.

The term "alkyl" or "alkyl group" denotes a saturated linear or a branched hydrocarbyl group. In an embodiment, the alkyl group contains 1 to 20 carbon atoms; in another embodiment, the alkyl group contains 1 to 12 carbon atoms; in another embodiment, the alkyl group contains 1 to 8 carbon atoms; in still another embodiment, the alkyl group contains 1 to 6 carbon atoms; and in still another embodiment, the alkyl group contains 1 to 3 carbon atoms. Examples of the alkyl group include, but are not limited to, methyl (Me, —CH$_3$), ethyl (Et, —CH$_2$CH$_3$), n-propyl (n-Pr, —CH$_2$CH$_2$CH$_3$), isopropyl (i-Pr), —CH(CH$_3$)$_2$), n-butyl (n-Bu, —CH$_2$CH$_2$CH$_2$CH$_3$), isobutyl (i-Bu, —CH$_2$CH (CH$_3$)$_2$), sec-butyl (s-Bu, —CH(CH$_3$) CH$_2$CH$_3$), tert-butyl (t-Bu, —C(CH$_3$)$_3$), n-pentyl (—CH$_2$CH$_2$CH$_2$CH$_2$CH$_3$), 2-pentyl (—CH(CH$_3$)CH$_2$CH$_2$CH$_3$), 3-pentyl (—CH (CH$_2$CH$_3$)$_2$), 2-methyl-2-butyl (—C(CH$_3$)$_2$CH$_2$CH$_3$), 3-methyl-2-butyl (—CH(CH$_3$)CH(CH$_3$)$_2$), 3-methyl-1-butyl (—CH$_2$CH$_2$CH(CH$_3$)$_2$), 2-methyl-1-butyl (—CH$_2$CH (CH$_3$)CH$_2$CH$_3$), n-hexyl (—CH$_2$CH$_2$CH$_2$CH$_2$CH$_2$CH$_3$), 2-hexyl (—CH(CH$_3$)CH$_2$CH$_2$CH$_2$CH$_3$), 3-hexyl (—CH (CH$_2$CH$_3$)(CH$_2$CH$_2$CH$_3$)), 2-methyl-2-pentyl (—C(CH$_3$)$_2$ CH$_2$CH$_2$CH$_3$), 3-methyl-2-pentyl (—CH(CH$_3$)CH(CH$_3$) CH$_2$CH$_3$), 4-methyl-2-pentyl (—CH(CH$_3$)CH$_2$CH(CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), 2,3-dimethyl-2-butyl(—C (CH$_3$)$_2$CH(CH$_3$)$_2$), 3,3-dimethyl-2-butyl (—CH(CH$_3$)C (CH$_3$)$_3$), n-heptyl, n-octyl and so on.

In an embodiment, the alkenyl group contains 2 to 20 carbon atoms; in another embodiment, the alkenyl group contains 2 to 12 carbon atoms; in still another embodiment, the alkenyl group comprises 2 to 8 carbon atoms; and in still another embodiment, the alkenyl group contains 2 to 6 carbon atoms. Examples of alkenyl groups include, but are not limited to, vinyl (—CH=CH$_2$), allyl (—CH$_2$CH=CH$_2$), and so on.

The term "alkynyl" denotes a linear hydrocarbon group having at least one carbon-carbon sp triple bond or a branched hydrocarbon group having at least one carbon-carbon sp triple bond. In an embodiment, the alkynyl group contains 2 to 20 carbon atoms; in another embodiment, the alkynyl group contains 2 to 12 carbon atoms; in still another embodiment, the alkynyl group comprises 2 to 8 carbon atoms; and in still another embodiment, the alkynyl group contains 2 to 6 carbon atoms. Examples of the alkynyl group include, but are not limited to, ethynyl (—C≡CH), propargyl (—CH$_2$C≡CH), 1-propynyl (—C≡C—CH$_3$), and so on.

The term "haloalkyl" denotes an alkyl group substituted by one or more halogen atoms, examples of which include, but are not limited to, trifluoromethyl and chloroethyl.

The inventors of the present disclosure find that the liquid crystal composition used in a liquid crystal display generally has problems such as a poor display under a low temperature condition. After in-depth study and experiments, the inventors find that this is mainly due to a narrow liquid crystal range of the known liquid crystal compositions. Under the low temperature condition, the mutual solubility of the liquid crystal composition is poor, and crystallization is easy to occur, which results in a large loss of liquid crystal performance and further results in a poor image display effect that can not meet the performance requirements on display under the low temperature condition. For example, in the fields of a vehicle-mounted liquid crystal display and an industrial instrument display with increasing demand year by year, such liquid crystal displays often need to work under extreme environmental conditions. However, the melting point S—N of the current liquid crystal compositions from crystalline to nematic phase is high (generally about −20° C.), and thus it is difficult to satisfy the liquid crystal display in the environment below −20° C. Moreover, the current liquid crystal compositions are also unsuitable for a long time display under the low temperature condition. For example, a display device manufactured by the current liquid crystal compositions cannot realize continuous display for 240 hours at −50° C. In addition, the current liquid crystal compositions have a high rotational viscosity, a small dielectric anisotropy, and a small optical anisotropy, which may further cause a poor display performance of the liquid crystal display, a long signal response time, and display ghosting. Therefore, if a liquid crystal composition having a wide liquid crystal range and a good mutual solubility under the low temperature condition is developed, the above problems are at least partially solved.

At least one embodiment of the present disclosure provides a liquid crystal composition, and the liquid crystal composition comprises: compounds having a structure represented by general formulae (I) to (II) respectively

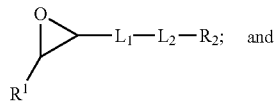

(I)

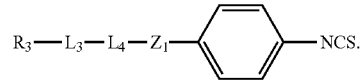

(II)

According to an embodiment of the present disclosure, in the compounds having the above formulae (I) to (II), $L_1$, $L_2$, $L_3$ and $L_4$ are independently selected from

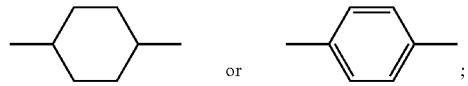

$Z_1$ is selected from a single bond or —C≡C—; $R_1$, $R_2$ and $R_3$ are independently selected from alkyl, alkenyl, alkynyl, haloalkyl or $OR_4$; and $R_4$ is selected from alkyl, alkenyl, alkynyl or haloalkyl.

As such, the liquid crystal composition has a wide nematic phase temperature range, and the melting point S—N of the liquid crystal composition from crystalline state to nematic phase is low to −50° C., and the liquid crystal composition has a low rotational viscosity, a high dielectric anisotropy, a high optical anisotropy and a good stability. The liquid crystal composition is suitable for the requirement of fast response liquid crystal display, has a good image display effect, and avoids display ghosting phenomenon. The liquid crystal composition can afford a low driving voltage, a fast response, and a wide application environment. The liquid crystal composition not only meets the requirements of low temperature work, but also meets the requirements of long-term display in the low temperature environment.

For easy to be understood, the principle of realizing the above technical effects is described below in detail.

A working principle of the liquid crystal display device (LCD) based on the liquid crystal composition is that: the liquid crystal composition is deflected by the driving voltage, and the deflected liquid crystal produces different reflections and transmissions to the backlight, thereby forming different contrast ratios to achieve the purpose of display. If a color filter is added, a color image can be displayed. Therefore, the performance of a liquid crystal composition would directly affect the effect of displaying an image. As described above, the current liquid crystal compositions have a narrow liquid crystal range, and are difficult to satisfy display requirements in the low temperature environment (for example, an ambient temperature of −20° C. or less). Moreover, the rotational viscosity of the current liquid crystal compositions is high, the dielectric anisotropy of the current liquid crystal compositions is small, and the optical orientation of the current liquid crystal compositions is small, which further causes poor display phenomenon of the liquid crystal display, such as a poor image display.

The inventors of the present disclosure find that in a liquid crystal composition comprising a compound of the formula (I) to (II), a synergistic effect of an oxiranyl

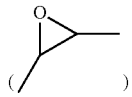

in the compound with the formula (I) and an isothiocyanato (—NCS) in the compound with the formula (II) increases the stability of the liquid crystal composition system, so that a liquid crystal monomer is not easy to be precipitated in the low temperature environment (for example, −50° C.). That is, an interaction between the oxiranyl and the isothiocyanato facilitates the mutual miscibility of the components in the liquid crystal composition under the low temperature condition, and broadens the nematic phase temperature range of the liquid crystal composition. Specifically, the melting point (S—N) of the liquid crystal composition from the crystalline state to the nematic phase is equal to or below −50° C. Moreover, the liquid crystal composition has a good stability and a wide use environment, which meets the display requirement in the low temperature environment, and nearly has no influence on the performance (has no performance loss) for a long time display in the low temperature condition. The liquid crystal composition is particularly suitable for the fields of the vehicle-mounted liquid crystal display and the industrial instrument display. For example, the liquid crystal composition has a broad market prospect and application value in the TN-TFT display and the IPS/FFS-TFT display operated under the extreme temperature environment. Moreover, the liquid crystal composition has a low rotational viscosity and is suitable for the requirement of a fast response liquid crystal display, thereby improving the display effect without the display ghosting phenomenon. The liquid crystal composition has a large dielectric anisotropy, and the liquid crystal composition can be driven at a lower driving voltage for being deflected to realize the liquid crystal display. The liquid crystal composition has a significant birefringence effect and a large optical anisotropy. In a case that the liquid crystal composition is used in the liquid crystal display, a thin liquid crystal layer can be used to realize a function of transmitting or shielding the backlight and achieve a liquid crystal display image. Not only is it beneficial to the thinning and lighting of the display device, but the thinner liquid crystal layer is also beneficial for further shortening the signal response time and improving the display effect. In general, the liquid crystal composition including the compounds of the general formulae (1) to (II) has a good liquid crystal property, a good stability, and a wide liquid crystal range, and the liquid crystal composition is suitable for the long-time display in the low temperature condition, and has an excellent display effect and a broad market prospect and application value.

According to an embodiment of the present disclosure, in the compounds having the general formulae (I) to (II), $R_1$, $R_2$ and $R_3$ are independently selected from alkyl, alkenyl, alkynyl, haloalkyl or $OR_4$; and $R_4$ is selected from alkyl, alkenyl, alkynyl or haloalkyl. For example, according to an embodiment of the present disclosure, $R_1$, $R_2$ and $R_3$ are independently selected from C1 to C8 alkyl, C2 to C8 alkenyl, C2 to C8 alkynyl, C1 to C8 haloalkyl or $OR_4$; and $R_4$ is selected from C1 to C8 alkyl, C2 to C8 alkenyl, C2 to C8 alkynyl or C1 to C8 haloalkyl. As such, the performance of the liquid crystal composition is further improved.

According to an embodiment of the present disclosure, in the compounds having the general formulae (I) to (II), $L_1$, $L_2$, $L_3$ and $L_4$ are

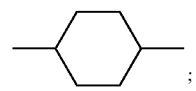

$Z_1$ is —C≡C—; $R_1$ is n-propyl; $R_2$ is vinyl; $R_3$ is methyl. That is, the compound (I) is

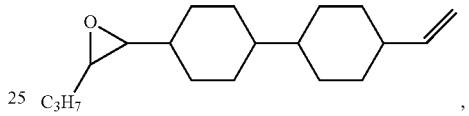

and the compound (II) is

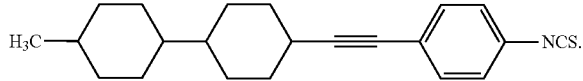

Thereby, the performance of the liquid crystal composition is further improved.

In some embodiments, in the liquid crystal composition comprising compounds having the general formulae (I) to (II), based on a total mass of the liquid crystal composition, the compound having the formula (I) has a mass percentage of about 10 wt % to 20 wt %.

In some embodiments, in the liquid crystal composition comprising compounds having the general formulae (I) to (II), based on the total mass of the liquid crystal composition, the compound having the formula (II) has a mass percentage of about 5 wt % to 15 wt %.

Thereby, the mutual solubility of the liquid crystal composition under the low temperature condition is improved, and the performance of the liquid crystal composition is further improved.

According to the embodiments of the present disclosure, the liquid crystal composition has a melting point (S—N)-50° C. from the crystalline state to the nematic phase, and a clearing point Cp of 103±5° C. As such, the liquid crystal composition has a wide temperature range of nematic phase, a good mutual solubility at the low temperature of −50° C., a wide nematic phase temperature range, a good stability, a wide use environment, and meets the requirements of display in a low temperature environment. The long-term display at the low temperature has little influence on its performance.

For example, the liquid crystal composition has a melting point (S—N) of −50° C. and a clearing point Cp of 130° C. According to the embodiments of the present disclosure, the liquid crystal composition has a low rotational viscosity, and the liquid crystal composition is suitable for the requirement of a fast response liquid crystal display, which improves the display effect and has no display ghosting phenomenon.

For example, the dielectric anisotropy Δε of the liquid crystal composition is 6.1±0.5 (tested at 25±0.5° C.). It should be noted that, Δε represents the orientation of the liquid crystal molecules under the action of electric field. Δε of the liquid crystal composition is high, and the liquid crystal display can be realized at a low driving voltage.

For example, the dielectric anisotropy Δε of the liquid crystal composition is 6.1 (tested at 25±0.5° C.).

For example, the optical anisotropy Δn of the liquid crystal composition is 0.118±0.005. It should be noted that, Δn represents a polarization degree of the liquid crystal under the action of the electric field. Δn of the liquid crystal composition is high, then the birefringence is high. Due to the significant birefringence effect, the liquid crystal display of the image can be realized by only a thin liquid crystal layer. The thin liquid crystal layer not only facilitates the thinning and lighting of the display device, but also is advantageous for further shortening the signal response time and improving the display effect.

For example, Δn of the liquid crystal composition is 0.118. Thereby, the performance of the liquid crystal composition is further improved.

In some embodiments, the liquid crystal composition further comprises compounds having the general formulae (III) to (VIII):

  (III)

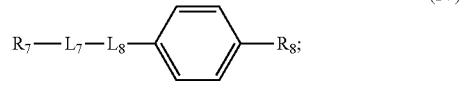  (IV)

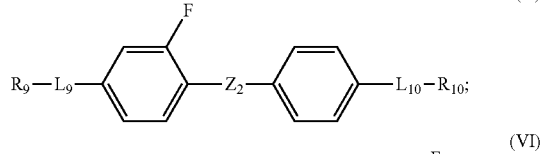  (V)

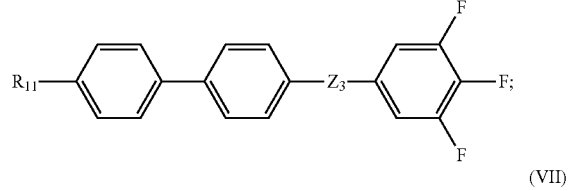  (VI)

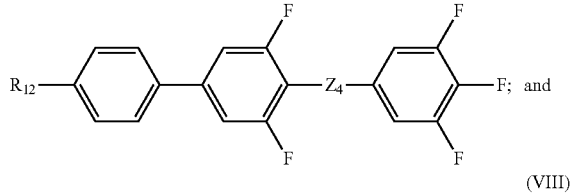  (VII)

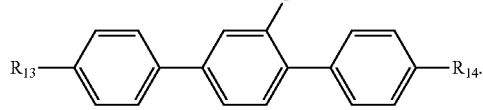  (VIII)

According to the embodiments of the present disclosure, in the compounds having the general formulae (III) to (VIII), $L_5$, $L_6$, $L_7$, $L_8$, $L_9$ and $L_{10}$ are independently selected from

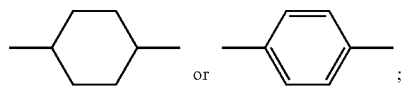

$Z_2$, $Z_3$ and $Z_4$ are independently selected from a single bond, —C═C—, —C≡C—, —O—, —COO—, —OCO—, —CH$_2$O— or —OCH$_2$—, $R_5$; $R_6$, $R_7$, $R_8$, $R_9$, $R_{10}$, $R_{11}$, $R_{12}$, $R_{13}$, and $R_{14}$ are independently selected from C1 to C8 alkyl, C2 to C8 alkenyl, C2 to C8 alkynyl, C1 to C8 haloalkyl or $OR_{15}$; and $R_{15}$ is selected from C1 to C8 alkyl, C2 to C8 alkenyl, C2 to C8 alkynyl or C1 to C8 haloalkyl. As such, the liquid crystal composition has a wide nematic phase temperature range, and the melting point S—N of the liquid crystal composition from crystalline state to nematic phase is low to −50° C., and the liquid crystal composition has a low rotational viscosity, a high dielectric anisotropy, a high optical anisotropy and a good stability. The liquid crystal composition is suitable for the requirement of fast response liquid crystal display, has a good image display effect, and avoids display ghosting phenomenon. The liquid crystal composition can afford a low driving voltage, a fast response, and a wide application environment. The liquid crystal composition not only meets the requirements of low temperature work, but also meets the requirements of long-term display in the low temperature environment.

According to an embodiment of the present disclosure, in the compounds having the general formulae (III) to (VIII), $L_5$, $L_6$, $L_7$, $L_8$, $L_9$ and $L_{10}$ are

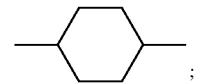

$Z_2$, $Z_3$ and $Z_4$ are —COO—; $R_5$, $R_9$, $R_{11}$, $R_{12}$, and $R_{13}$ are n-propyl; $R_6$ is vinyl; $R_7$ and $R_{14}$ are n-butenyl; $R_8$ is methyl; and $R_{10}$ is ethoxy. That is to say, the compound (III) is

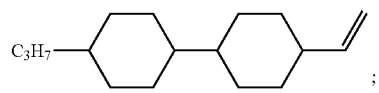

the compound (IV) is

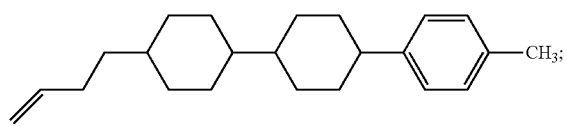

the compound (V) is

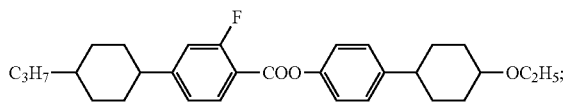

the compound (VI) is

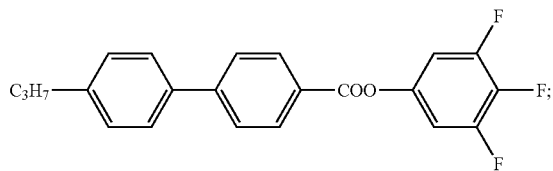

the compound (VII) is

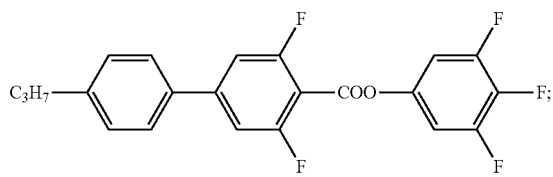

the compound (VIII) is

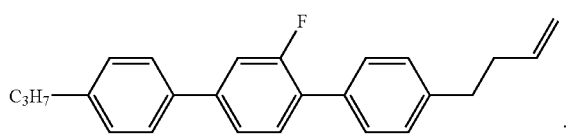

Thereby, the performance of the liquid crystal composition is further improved.

In some embodiments, the liquid crystal composition comprises compounds having structural formulae (1) to (8) respectively:

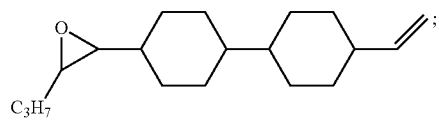

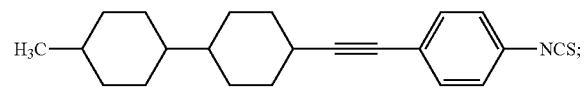

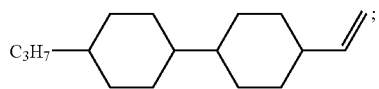

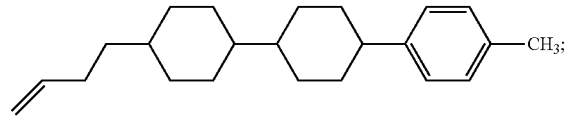

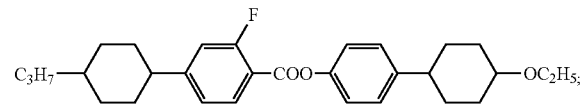

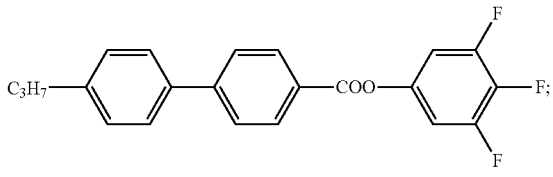

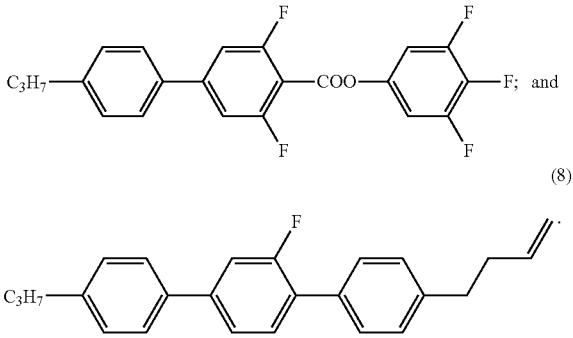

As such, the liquid crystal composition has a wide nematic phase temperature range, and the melting point S—N of the liquid crystal composition from crystalline state to nematic phase is low to −50° C., and the liquid crystal composition has a low rotational viscosity, a high dielectric anisotropy, a high optical anisotropy and a good stability. The liquid crystal composition is suitable for the requirement of fast response liquid crystal display, has a good image display effect, and avoids display ghosting phenomenon. The liquid crystal composition can afford a low driving voltage, a fast response, and a wide application environment. The liquid crystal composition not only meets the requirements of low temperature work, but also meets the requirements of long-term display in the low temperature environment.

In some embodiments, in the liquid crystal composition having the compounds (1) to (8), based on a total mass of the liquid crystal composition, the compound having the formula (1) has a mass percentage of about 15 wt %.

In some embodiments, in the liquid crystal composition having the compounds (1) to (8), based on the total mass of the liquid crystal composition, the compound having the formula (2) has a mass percentage of about 10 wt %. Thereby, the mutual solubility of the liquid crystal composition under the low temperature condition is improved, and the performance of the liquid crystal composition is further improved.

In another aspect of the present disclosure, the present disclosure provides a display device. The display device includes any one of the liquid crystal compositions mentioned above. Thus, the display device has all of the features and advantages of the liquid crystal composition mentioned above, which are omitted herein. In general, the display device has a good image display, no display ghosting phenomenon, a low driving voltage, a fast response, and a wide application environment, which not only meets the requirements of low temperature work, but also meets the requirements of long-term display in the low temperature environment. According to the embodiments of the present disclosure, the specific type and the application field of the above display device are not particularly limited. For example, the display device can be used in the field of the vehicle-mounted liquid crystal display and the industrial instrument display, or the display in an extreme temperature environment, such as the TN-TFT type liquid crystal display and the IPS/FFS-TFT type liquid crystal display.

The solutions of the present disclosure are explained below in connection with the embodiments. Those skilled in the art would understand that the following embodiments are merely illustrative of the present disclosure and are not to be considered as limitation on the scope of the present disclosure. The examples for which specific techniques or conditions are not indicated, are carried out according to the techniques or conditions described in the literatures in the art or in accordance with the product specifications. If the manufacturer is not given for reagents or instruments, they are all conventional products that are commercially available.

In the following embodiments, each of the employed compound components is synthesized by a conventional organic synthesis method or commercially obtained.

In the following embodiments, the liquid crystal composition is prepared according to the ratio of the components in the liquid crystal composition. The liquid crystal composition is prepared according to a conventional method in the art, the components in proportion are mixed evenly by heating, ultrasonic, suspension, mechanical stirring, and so on.

First Embodiment

The liquid crystal composition includes compounds having structural formulae (I) to (VIII):

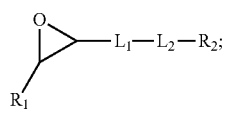
(I)

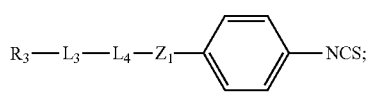
(II)

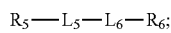
(III)

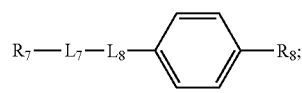
(IV)

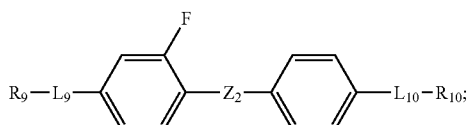
(V)

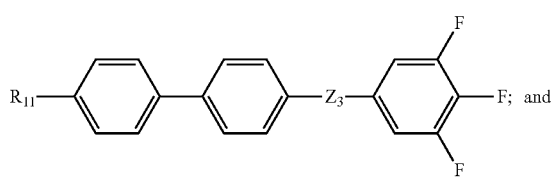
(VI)

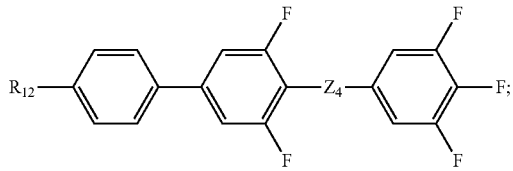
(VII)

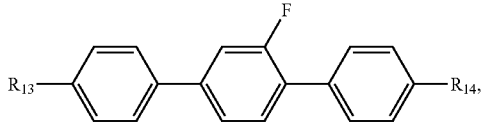
(VIII)

in which, $L_1$ to $L_{10}$ are

;

$Z_1$ is —C≡C—, $Z_2$, $Z_3$ and $Z_4$ are —COO—; $R_1$ is n-propyl, both $R_2$ and $R_6$ are vinyl, $R_3$ is methyl, $R_5$, $R_9$, and $R_{11}$ to $R_{13}$ are n-propyl, both $R_7$ and $R_{14}$ are n-butenyl, $R_8$ is methyl, and $R_{10}$ is ethoxy.

A specific ratio of the compounds based on a total mass of the liquid crystal composition is: a content of the compound (I) is 15 wt %, a content of the compound (II) is 10 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

First Comparative Example

The liquid crystal composition includes compounds (III) to (VIII), and the structural formulae of the compounds (III) to (VIII) in the first comparative example are the same as those in the first embodiment.

In the formulae (III) to (VIII), $L_5$ to $L_{10}$ are

;

$Z_2$, $Z_3$ and $Z_4$ are —COO—; $R_6$ is vinyl, $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (III) is 40 wt %, a content of the compound (IV) is 15 wt %, a content of the compound (V) 15 wt %, a content of the compound (VI) is 10 wt %, a content of the compound (VII) is 10 wt %, and a content of the compound (VIII) is 10 wt %.

Second Comparative Example

The liquid crystal composition includes compounds (I), (III) to (VIII), and the structural formulae of the compounds (I), (III) to (VIII) in the second comparative example are the same as those in the first embodiment.

In the formulae (I), (III) to (VIII), $L_1$ to $L_2$ and $L_5$ to $L_{10}$ are

$Z_2$, $Z_3$ and $Z_4$ are —COO—; $R_1$ is n-propyl; $R_2$ and $R_6$ are vinyl; $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (I) is 10 wt %, a content of the compound (III) is 30 wt %, a content of the compound (IV) is 15 wt %, a content of the compound (V) is 15 wt %, a content of the compound (VI) is 10 wt %, a content of the compound (VII) is 10 wt %, and a content of the compound (VIII) is 10 wt %.

Third Comparative Example

The liquid crystal composition includes compounds (II) to (VIII), and the structural formulae of the compounds (II) to (VIII) in the third comparative example are the same as those in the first embodiment.

In the formulae (II) to (VIII), $L_3$ to $L_{10}$ are

$Z_1$ is —C≡C—; $Z_2$, $Z_3$ and $Z_4$ are —COO—; $R_6$ is vinyl; $R_3$ is methyl; $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (II) is 10 wt %, a content of the compound (III) is 30 wt %, a content of the compound (IV) is 15 wt %, a content of the compound (V) is 15 wt %, a content of the compound (VI) is 10 wt %, a content of the compound (VII) is 10 wt %, and a content of the compound (VIII) is 10 wt %.

Second Embodiment

The liquid crystal composition includes compounds (I) to (VIII), and the structural formulae of the compounds (I) to (VIII) in the second embodiment are the same as those in the first embodiment.

In the formulae (I) to (VIII), $L_1$ to $L_{10}$ are

$Z_1$ is —C≡C—; $Z_2$, $Z_3$ and $Z_4$ are —COO—; $R_1$ is n-propyl; $R_2$ and $R_6$ are vinyl; $R_3$ is methyl; $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (I) is 10 wt %, a content of the compound (II) is 15 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

Third Embodiment

The liquid crystal composition includes compounds (I) to (VIII), and the structural formulae of the compounds (I) to (VIII) in the third embodiment are the same as those in the first embodiment.

In the formulae (I) to (VIII), $L_1$ to $L_{10}$ are

$Z_1$ is —C≡C—; $Z_2$, $Z_3$ and $L_4$ are —COO—; $R_1$ is n-propyl; $R_2$ and $R_6$ are vinyl; $R_3$ is methyl; $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (I) is 20 wt %, a content of the compound (II) is 5 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

Fourth Embodiment

The liquid crystal composition includes compounds (I) to (VIII), and the structural formulae of the compounds (I) to (VIII) in the fourth embodiment are the same as those in the first embodiment.

In the formulae (I) to (VIII), both $L_1$ and $L_2$ are

$L_3$ to $L_{10}$ are

$Z_1$ is a single bond; $Z_2$, $Z_3$ and $L_4$ are —COO—; $R_1$ is n-propyl; $R_2$ and $R_6$ are vinyl; $R_3$ is methyl; $R_5$, $R_9$, and $R_{11}$ to $R_{13}$ are n-propyl; both $R_7$ and $R_{14}$ are n-butenyl; $R_8$ is methyl; and $R_{10}$ is ethoxy.

A specific ratio of the compounds based on a total mass of the liquid crystal composition is: a content of the compound (I) is 15 wt %, a content of the compound (II) is 10 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

Fifth Embodiment

The liquid crystal composition includes compounds (I) to (VIII), and the structural formulae of the compounds (I) to (VIII) in the fifth embodiment are the same as those in the first embodiment.

In the formulae (I) to (VIII), both $L_1$ and $L_2$ are

$L_3$ to $L_{10}$ are

$Z_1$ is a single bond; $Z_2$, $Z_3$ and $Z_4$ are —C≡C—; $R_1$ is n-butenyl; $R_2$ is $OR_4$ ($R_4$ is —$CH_2CH_2CH_2CH_3$); $R_3$ is —$CH_2CH$=$CH_2$; $R_6$ is vinyl; $R_5$, $R_9$, and $R_{11}$ to $R_{13}$ are n-butyl; both $R_7$ and $R_{14}$ are n-butenyl; $R_8$ is —$CH_2CH(CH_3)_2$; and $R_{10}$ is ethoxy.

A specific ratio of the compounds based on a total mass of the liquid crystal composition is: a content of the compound (I) is 10 wt %, a content of the compound (II) is 15 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

Sixth Embodiment

The liquid crystal composition includes compounds (I) to (VIII), and the structural formulae of the compounds (I) to (VIII) in the sixth embodiment are the same as those in the first embodiment.

In the formulae (I) to (VIII), $L_1$ to $L_{10}$ are

$Z_1$ is a single bond; $Z_2$, $Z_3$ and $Z_4$ are —OCO—; $R_1$ is $OR_4$ ($R_4$ is —$CH_2CH_2CH_2CH_3$); $R_2$ is —$CH_2CH$=$CH_2$; $R_3$ is n-butenyl; $R_6$ is vinyl; $R_5$, $R_9$, and $R_{11}$ to $R_{13}$ are n-pentyl; both $R_7$ and $R_{14}$ are $OR_{15}$ ($R_{15}$ is —$CH_2CH_2CH$=$CH_2$); $R_8$ is ethoxy; and $R_{10}$ is —$CH_2CH(CH_3)_2$.

A specific ratio of the compounds based on a total mass of the liquid crystal composition is: a content of the compound (I) is 20 wt %, a content of the compound (II) is 5 wt %, a content of the compound (III) is 35 wt %, a content of the compound (IV) is 10 wt %, a content of the compound (V) is 10 wt %, a content of the compound (VI) is 5 wt %, a content of the compound (VII) is 5 wt %, and a content of the compound (VIII) is 10 wt %.

The specific compounds and the ratios (wt %) of the first comparative example to the third comparative example and the first embodiment to the sixth embodiment are shown in the table 1.

Performance Tests:

Each of the liquid crystal compositions of the first comparative example to the third comparative example and the first embodiment to the sixth embodiment are subjected to performance tests, and the performance tests comprise the melting point (S—N) from crystalline state to nematic phase, the clearing point Cp, the dielectric anisotropy Δε, and the optical anisotropy Δn. The specific meanings and the test conditions of the above symbols are as follows:

S—N: a melting point of the liquid crystal from the crystalline state to the nematic phase, in Celsius degrees (° C.).

Cp: a clearing point of the liquid crystal, that is, a phase transition temperature from the nematic phase to isotropic, in Celsius degrees (° C.).

Δε: dielectric anisotropy, Δε=ε//−68⊥, in which ε// is a dielectric constant parallel to the molecular axis (a dielectric constant in a long axis direction), and ε⊥ is a dielectric constant perpendicular to the molecular axis (a dielectric constant in a short axis direction), test conditions: 25±0.5° C., 1 KHz, HP4284 A, a 5.2 μm TN left-handed box is used.

Δn: optical anisotropy, $Δn=n_e-n_o$, in which no is a refractive index of extraordinary light (a refractive index in the long axis direction), and $n_o$ is a refractive index of ordinary light (a refractive index in the short axis direction), and the test conditions are: light with a wavelength of 589 nm, 25±0.5° C.

The testing results of the liquid crystal compositions in the first comparative example to the third comparative example and the first embodiment are shown in table 2. In the following, the first comparative example to the third comparative example and the first embodiment are taken as examples, and the test results of the second embodiment to the sixth embodiment are similar to the test results of the first embodiment.

TABLE 2

| | First comparative example | Second comparative example | Third comparative example | First embodiment |
|---|---|---|---|---|
| S—N (° C.) | −20 | −20 | −20 | −50 |
| Cp (° C.) | 97 | 100 | 102 | 103 |
| Δε | 5.2 | 5.5 | 5.6 | 6.1 |
| Δη | 0.107 | 0.110 | 0.112 | 0.118 |

By comparing the performance tests of the liquid crystal composition in the first embodiment with those of the first comparative example to the third comparative example, the Cp of the liquid crystal composition in the first embodiment is increased to 103° C., and the S—N of the liquid crystal composition in the first embodiment is decreased from −20° C. to −50° C. because the liquid crystal composition in the first embodiment comprises both the compound (1) containing oxiranyl

TABLE 1

| compound | First comparative example (wt %) | Second comparative example (wt %) | Third comparative example (wt %) | First embodiment (wt %) | Second embodiment (wt %) | Third embodiment (wt %) | Fourth embodiment (wt %) | Fifth embodiment (wt %) | Sixth embodiment (wt %) |
|---|---|---|---|---|---|---|---|---|---|
| (I) | 0 | 10 | 0 | 15 | 10 | 20 | 15 | 10 | 20 |
| (II) | 0 | 0 | 10 | 10 | 15 | 5 | 10 | 15 | 5 |
| (III) | 40 | 30 | 30 | 35 | 35 | 35 | 35 | 35 | 35 |
| (IV) | 15 | 15 | 15 | 10 | 10 | 10 | 10 | 10 | 10 |
| (V) | 15 | 15 | 15 | 10 | 10 | 10 | 10 | 10 | 10 |
| (VI) | 10 | 10 | 10 | 5 | 5 | 5 | 5 | 5 | 5 |
| (VII) | 10 | 10 | 10 | 5 | 5 | 5 | 5 | 5 | 5 |
| (VIII) | 10 | 10 | 10 | 10 | 10 | 10 | 10 | 10 | 10 |

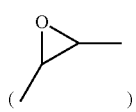

$$(\text{\includegraphics}) _5$$

and the compound (2) containing isothiocyanato (—NCS). Therefore, the liquid crystal composition in the first embodiment has a wide nematic phase temperature range, in particular, its S—N is as low as −50° C. In a case that the liquid crystal composition in the first embodiment is used in liquid crystal display, it has a wide range of application environment, a good stability, no performance loss at low temperature, and can meet the requirements of low temperature work. The Δϵ and Δn of the liquid crystal composition in the first embodiment are also increased, that is, the dielectric anisotropy is high, and the optical anisotropy is high. In a case that the liquid crystal composition in the first embodiment is used in the liquid crystal display, a low driving voltage, a fast response, and a good image display effect can be afforded.

In order to further characterize the properties of the liquid crystal compositions in the above comparative embodiments and the embodiments, a low temperature storage experiment is carried out. In the following, the first comparative embodiment to the third comparative embodiment and the first embodiment are taken as examples, and the test results of the second embodiment to the sixth embodiment are similar to the test results of the first embodiment.

The steps of the low temperature storage experiment are as follows: placing the liquid crystal compositions in the first comparative example to the third comparative example and the first embodiment in glass bottles with a same specification, and each of the glass bottles is provided with 2 g of the liquid crystal composition. The glass bottles are stored in a freezer at −10° C., −20° C., −30° C., −40° C., and −50° C. respectively. The test results are shown in tables 3-7.

(✓: no crystallization; ×: crystallization; Day: storage days)

TABLE 3

| −10° C. | Day 1 | Day 2 | Day 3 | Day 4 | Day 5 | Day 6 | Day 7 | Day 8 | Day 9 | Day 10 |
|---|---|---|---|---|---|---|---|---|---|---|
| First comparative example | ✓ | ✓ | ✓ | ✓ | ✓ | ✓ | ✓ | ✓ | ✓ | ✓ |
| Second comparative example | ✓ | ✓ | ✓ | ✓ | ✓ | ✓ | ✓ | ✓ | ✓ | ✓ |
| Third comparative example | ✓ | ✓ | ✓ | ✓ | ✓ | ✓ | ✓ | ✓ | ✓ | ✓ |
| First embodiment | ✓ | ✓ | ✓ | ✓ | ✓ | ✓ | ✓ | ✓ | ✓ | ✓ |

TABLE 4

| −20° C. | Day 1 | Day 2 | Day 3 | Day 4 | Day 5 | Day 6 | Day 7 | Day 8 | Day 9 | Day 10 |
|---|---|---|---|---|---|---|---|---|---|---|
| First comparative example | ✓ | ✓ | ✓ | ✓ | ✓ | ✓ | × | | | |
| Second comparative example | ✓ | ✓ | ✓ | ✓ | ✓ | ✓ | ✓ | × | | |
| Third comparative example | ✓ | ✓ | ✓ | ✓ | ✓ | ✓ | × | | | |
| First embodiment | ✓ | ✓ | ✓ | ✓ | ✓ | ✓ | ✓ | ✓ | ✓ | ✓ |

TABLE 5

| −30° C. | Day 1 | Day 2 | Day 3 | Day 4 | Day 5 | Day 6 | Day 7 | Day 8 | Day 9 | Day 10 |
|---|---|---|---|---|---|---|---|---|---|---|
| First comparative example | × | | | | | | | | | |
| Second comparative example | × | | | | | | | | | |
| Third comparative example | × | | | | | | | | | |
| First embodiment | ✓ | ✓ | ✓ | ✓ | ✓ | ✓ | ✓ | ✓ | ✓ | ✓ |

TABLE 6

| −40° C. | Day 1 | Day 2 | Day 3 | Day 4 | Day 5 | Day 6 | Day 7 | Day 8 | Day 9 | Day 10 |
|---|---|---|---|---|---|---|---|---|---|---|
| First comparative example | × | | | | | | | | | |
| Second comparative example | × | | | | | | | | | |
| Third comparative example | × | | | | | | | | | |
| First embodiment | ✓ | ✓ | ✓ | ✓ | ✓ | ✓ | ✓ | ✓ | ✓ | ✓ |

TABLE 7

| -50° C. | Day 1 | Day 2 | Day 3 | Day 4 | Day 5 | Day 6 | Day 7 | Day 8 | Day 9 | Day 10 |
|---|---|---|---|---|---|---|---|---|---|---|
| First comparative example | x | | | | | | | | | |
| Second comparative example | x | | | | | | | | | |
| Third comparative example | x | | | | | | | | | |
| First embodiment | ✓ | ✓ | ✓ | ✓ | ✓ | ✓ | ✓ | ✓ | ✓ | ✓ |

By comparing the performance tests of the liquid crystal composition in the first embodiment with the liquid crystal compositions of the first comparative example to the third comparative example, no crystallization of the liquid crystal composition in the first embodiment occurs after storing at −20° C., −30° C., −40° C., and −50° C. for 10 days because the liquid crystal composition in the first embodiment comprises both the compound (1) containing oxiranyl

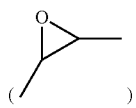

and the compound (2) containing isothiocyanato (—NCS). It further indicates that the liquid crystal composition in the first embodiment is suitable for a low temperature working environment, and the low temperature working environment can be as low as −50° C. In a case that the liquid crystal composition in the first embodiment is used in liquid crystal display, it has a wide range of application environment, a good stability, and no performance loss at low temperature, and can meet the requirements of low temperature work. Moreover, the liquid crystal composition in the first embodiment can be stored at the low temperature for 10 days, and in a case that the liquid crystal composition is used in the liquid crystal display, it can meet the long-term display requirements in the low temperature environment.

In the present specification, the terms "an embodiment", "another embodiment" or the like means that the specific features, structures, materials or characteristics described in connection with the embodiments are included in at least one embodiment of the present disclosure. In the present specification, the schematic representation of the above terms are not necessarily directed to the same embodiment or the same example. Furthermore, the described particular features, structures, materials, or characteristics are able to be combined in suitable manners in any one or more embodiments or examples. In addition, those skilled in the art can combine different embodiments or different examples described in the specification and the features of different embodiments or different examples, without contradicting with each other.

What are described above is related to only the illustrative embodiments of the present disclosure and not limitative to the protection scope of the present application. Any changes or substitutions that are easy for those skilled in the art to envisage are intended to be encompassed within the scope of the present disclosure. Therefore, the protection scope of the present application shall be defined by the accompanying claims.

What is claimed is:

1. A liquid crystal composition, comprising: a compound having a structure represented by general formula (I) and a compound having a structure represented by general formula (II),

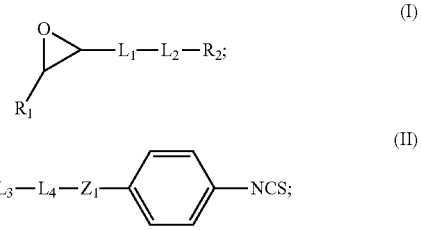

wherein
$L_1$, $L_2$, $L_3$ and $L_4$ are

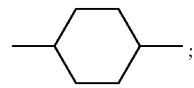

$Z_1$ is —C≡C—;
$R_1$ is N-propyl;
$R_2$ is vinyl; and
$R_3$ is methyl.

2. The liquid crystal composition according to claim 1, wherein
based on a total mass of the liquid crystal composition, the compound having the formula (I) has a mass percentage of about 10 wt % to 20 wt %; and the compound having the formula (II) has a mass percentage of about 5 wt % to 15 wt %.

3. The liquid crystal composition according to claim 1, wherein the liquid crystal composition has a melting point (S—N) no more than −50° C. from a crystalline state to a nematic phase.

4. The liquid crystal composition according to claim 3, wherein the liquid crystal composition has one or more of the following properties:
a clearing point Cp of the liquid crystal composition is 103±5° C.;
a dielectric anisotropy $\Delta\epsilon$ of the liquid crystal composition is 6.1±0.5; and
an optical anisotropy $\Delta n$ of the liquid crystal composition is 0.118±0.005.

5. The liquid crystal composition according to claim 1, further comprising: compounds having a structure represented by general formulae (III) to (VIII) respectively:

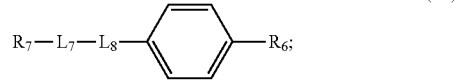

-continued (V)

R$_9$—L$_9$—[ring with F]—Z$_2$—[ring]—L$_{10}$—R$_{10}$;

(VI)

R$_{11}$—[ring]—[ring]—Z$_3$—[ring with F,F,F];

(VII)

R$_{12}$—[ring with F,F]—Z$_4$—[ring with F,F]—F; and (VIII)

R$_{13}$—[ring]—[ring with F]—[ring]—R$_{14}$;

wherein
L$_5$, L$_6$, L$_7$, L$_8$, L$_9$ and L$_{10}$ are independently selected from a group consisting of

[cyclohexyl] or [phenyl];

Z$_2$, Z$_3$ and Z$_4$ are independently selected from a group consisting of a single bond,
—C C=C—, —C≡C—, —O—, —COO—, —OCO—, —CH$_2$O— or —OCH$_2$—;
R$_5$, R$_6$, R$_7$, R$_8$, R$_9$, R$_{10}$, R$_{11}$, R$_{12}$, R$_{13}$, and R$_{14}$ are independently selected from a group consisting of C1 to C8 alkyl, C2 to C8 alkenyl, C2 to C8 alkynyl, C1 to C8 haloalkyl, or OR$_{15}$; and
R$_{15}$ is selected from a group consisting of C1 to C8 alkyl, C2 to C8 alkenyl, C2 to C8 alkynyl, or C1 to C8 haloalkyl.

6. The liquid crystal composition according to claim 5, wherein
L$_5$, L$_6$, L$_7$, L$_8$, L$_9$ and L$_{10}$ are

[cyclohexyl];

Z$_2$, Z$_3$ and Z$_4$ are —COO—;
R$_5$, R$_9$, R$_{11}$, R$_{12}$, and R$_{13}$ are n-propyl;
R$_6$ is vinyl;
R$_7$ and R$_{14}$ are n-butenyl;
R$_8$ is methyl; and
R$_{10}$ is ethoxy.

7. The liquid crystal composition according to claim 5, comprising compounds having structural formulae (1) to (8) respectively:

(1) [structure with epoxide, two cyclohexyls, vinyl; C$_3$H$_7$]

(2) H$_3$C—[cyclohexyl]—[cyclohexyl]—C≡C—[phenyl]—NCS (3) C$_3$H$_7$—[cyclohexyl]—[cyclohexyl]—vinyl (4) [butenyl]—[cyclohexyl]—[cyclohexyl]—[phenyl]—CH$_3$ (5) C$_3$H$_7$—[cyclohexyl]—[phenyl with F]—COO—[phenyl]—[cyclohexyl]—OC$_2$H$_5$ (6) C$_3$H$_7$—[phenyl]—[phenyl]—COO—[phenyl with F,F,F]—F (7) C$_3$H$_7$—[phenyl]—[phenyl with F,F]—COO—[phenyl with F,F]—F; and (8) C$_3$H$_7$—[phenyl]—[phenyl with F]—[phenyl]—butenyl 8. The liquid crystal composition according to claim 7, wherein based on a total mass of the liquid crystal composition, the compound having the structural formula (1) has a mass percentage of about 15 wt %; and the compound having the structural formula (2) has a mass percentage of about 10 wt %.

9. A display device, comprising the liquid crystal composition according to claim 1.

* * * * *